United States Patent [19]

Medalia et al.

[11] Patent Number: 5,200,164
[45] Date of Patent: Apr. 6, 1993

[54] EASILY DISPERSIBLE CARBON BLACKS

[75] Inventors: Avrom I. Medalia, Newton; Eva M. Breckner, Cambridge; James A. Belmont, Maynard, all of Mass.

[73] Assignee: Cabot Corporation, Boston, Mass.

[21] Appl. No.: 626,434

[22] Filed: Dec. 12, 1990

Related U.S. Application Data

[63] Continuation-in-part of Ser. No. 504,215, Apr. 4, 1990, abandoned.

[51] Int. Cl.$^5$ ............................................. C09C 1/56
[52] U.S. Cl. .................................. 423/265; 423/445; 423/460; 106/478
[58] Field of Search ............... 423/445, 460, 265, 274; 106/476, 477, 478

[56] References Cited

U.S. PATENT DOCUMENTS

| | | | |
|---|---|---|---|
| 4,001,035 | 1/1979 | Ito et al. | 106/476 |
| 4,221,773 | 9/1980 | Tsvkagoshi et al. | 423/445 |
| 4,642,330 | 2/1987 | Quinn | 106/476 |

*Primary Examiner*—Michael Lewis
*Assistant Examiner*—Stuart L. Hendrickson
*Attorney, Agent, or Firm*—Lawrence A. Chaletsky; Harry J. Gwinnell

[57] ABSTRACT

Carbon blacks treated with a treating agent comprising at least one compound containing at least one long chain alkenyl or alkyl group and at least one amine group. Optionally, the compound contains at least one chemical group for linking the long chain alkenyl or alkyl group with the amine group. Also disclosed are ink compositions incorporating the treated carbon blacks and processes for preparing the compositions.

13 Claims, No Drawings dispersion of carbon black pigment in ink compositions, such as newsinks.

EASILY DISPERSIBLE CARBON BLACKS

This application is a continuation-in-part of U.S. patent application Ser. No. 07/504,215 filed Apr. 4, 1990 now abandoned.

FIELD OF THE INVENTION

The present invention relates to a class of treated carbon blacks having improved dispersion properties which are suitable for various applications and particularly well suited for use in ink compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as pigments in the formulation of ink compositions, paints and the like, wherein it is generally desirable to use a carbon black pigment which can be easily dispersed.

For example, newsink compositions are made in two stages. First the carbon black pigment and a dispersing vehicle, comprising resin, additives, and oil or solvent, are mixed to form a "premix" and then the premix is ground, for example, in a shot mill, to complete the dispersion of the carbon black in the ink composition. Dispersion of the carbon black pigment in the ink composition occurs during the formation of the premix and during the grinding of the premix. A carbon black pigment which is easy to disperse will allow an ink maker to produce an ink in a reduced period of time, which results in improved economy. For the above reasons, and others, it would be advantageous to produce an easily dispersible carbon black pigment.

It is also desirable to produce ink compositions which have reduced tendency to rub off the printed paper and onto the reader's hands, clothing and/or furniture. For example, it is generally desirable for newsinks, utilized in printing newspapers, to have little tendency to rub off. One way to reduce rub-off is to use a carbon black pigment with lower structure, i.e. a lower dibutyl phthalate adsorption number. Unfortunately, however, such carbon blacks are difficult to disperse. Therefore, there is a need for a carbon black which is easy to disperse and provides an ink composition with reduced rub-off. By means of the present invention, a carbon black having good rub-off properties but poor dispersibility can be modified to produce a treated carbon black having similar rub-off properties with improved dispersibility characteristics.

One method, as shown in the article entitled "The Dispersibility and Stability of Carbon Black in Media of Low Dielectric Constant. 1. Electrostatic and Steric Contributions to Colloidal Stability"; Pugh, Matsunaga and Fowkes; Colloids and Surfaces, 7 (1983) 183-207, of dispersing carbon black in an ink formulation is to add a dispersant into the oil or solvent with the carbon black. The presence of the dispersant in the oil or solvent increases the dispersibility of the carbon black.

SUMMARY OF THE INVENTION

We have discovered that the dispersibility of carbon black can be advantageously further increased by pretreating a carbon black with an effective amount of a treating agent sufficient to improve the dispersing characteristics of the carbon black while still allowing the carbon black to be subsequently pelletized, if desired, thereby forming a treated carbon black. While any carbon black may be utilized as the starting material, preferably the carbon black will have a DBPA (dibutyl phthlate absorption) of 35-130 cc/100 g and an $I_2$No. (iodine adsorption number) of 25-150 $mgI_2/g$.

The treating agent suitable for use in the present invention comprises at least one compound containing at least one long chain alkenyl or alkyl group and at least one amine group. Preferably the alkenyl or alkyl group contains 50-100 carbon atoms and more preferably 60-70 carbon atoms. Optionally, the compound may contain at least one chemical group suitable for linking the alkenyl or alkyl group with the amine group.

The amount of treating agent utilized in the present invention will be an amount sufficient to improve the dispersing characteristics of the carbon black while still allowing the carbon black to be free flowing or subsequently pelletized, if desired. In general, the amounts would be such that the resultant carbon blacks have 0.25-20%, by weight, of treating agent. Preferably, the carbon blacks of the present invention are treated with amounts of the treating agent such that the resultant carbon blacks have 0.5-8%, by weight, of treating agent. In preparing the treated carbon blacks, additional conventional ingredients may be added. In all cases, the weight fraction of carbon black in the treated carbon black is greater than 100/(100+DBPA of the carbon black), so that the treated carbon black is substantially dry and free-flowing.

We have also discovered new ink compositions in which the treated carbon blacks are incorporated.

The carbon black used to produce the treated carbon blacks of the present invention may be produced in a furnace carbon black reactor having a first (combustion) zone, a transition zone, and a reaction zone. A carbon black yielding feedstock is injected, in any manner known to the art, into a hot combustion gas stream. The resultant mixture of hot combustion gases and feedstock passes into the reaction zone. Pyrolysis of the carbon black yielding feedstock is stopped by quenching the mixture when the carbon blacks have been formed. Preferably pyrolysis is stopped by a quench injecting a quenching fluid.

In producing the treated carbon blacks of the present invention, a carbon black is contacted, in any manner, with the treating agent as described herein. For example, the treating agent, with or without any pelletizing oil added, may be sprayed onto a fluffy carbon black, and the resulting mixture agitated if needed. The resulting mixture may be used as such in the fluffy state, or may be pelletized, such as, for example, by means of a dry drum pelletizer. In another manner, the treating agent may be sprayed onto, and thoroughly contacted with, a fluffy carbon black and then pelletizing oil may be added to the mixture of carbon black and treating agent. It is also possible to add pelletizing oil to a fluffy carbon black and subsequently to add the treating agent. Alternatively, an aqueous solution or emulsion of the treating agent may be prepared and mixed with the carbon black.

The compositions for which the novel treated carbon blacks of this invention are effective as pigments include inks, paints, liquid toners and the like. The novel treated carbon blacks are particularly effective, however, in the preparation of newsink compositions and web off-set gloss heat-set (WOGHS) ink compositions.

In general, newsink compositions comprise about 5 to about 35 parts by weight of carbon black pigment, 0 to about 40 parts by weight of a resin or a mixture of resins, about 30 to about 95 parts by weight of oil(s) or solvent(s), and 0 to about 25 parts by weight of an additive or additives. Suitable resins are, for example, hydrocarbon resins and rosin-modified phenolics. Suitable oils and solvents are, for example, aromatic mineral oils, paraffinic mineral oils, naphthenic mineral oils, hydrocarbon solvents, or vegetable oils such as castor oil. Suitable additives are, for example, viscosity stabilizers, dispersing agents, blue toner, waxes, asphaltum complexes such as gilsonite, and fillers such as clays.

In general, WOGHS ink compositions comprise about 5 to about 60 parts by weight of carbon black pigment, about 20 to about 60 parts by weight of a resin or resins, about 20 to about 60 parts by weight of oil(s) or solvent(s), and 0 to about 20 parts by weight of an additive or additives. Suitable resins are, for example, hydrocarbon resins, phenolic modified resin esters, alkyd resins, and rosin. Suitable oils and solvents are, for example, hydrocarbon solvents, mineral oils, and vegetable oils such as linseed oil or soybean oil. Suitable additives are, for example, plasticizers, clays, gilsonite, waxes, driers, blue toner, silica, or dispersants.

An advantage of the treated carbon blacks of the present invention is that the carbon blacks are easily dispersible. Accordingly, carbon blacks which have good rub-off properties but are too difficult to practically disperse can be modified and made useable.

It is a further advantage that ink compositions containing the treated carbon blacks of the present invention may be prepared more quickly.

It is a still further advantage of the present invention that pelletized carbon blacks, prepared in accordance with the present invention, have good dispersing characteristics. Advantages of the pelletized, versus fluffy, form of carbon blacks are well known in the industry and include higher bulk density, with resulting economy in shipping and storage; greater ease of bulk handling; and less dusting.

Another advantage is that the gloss of WOGHS ink compositions containing the treated carbon blacks of the present invention is higher.

Other advantages of the present invention will become apparent from the following more detailed description of the invention.

DETAILED DESCRIPTION OF THE INVENTION

The unique product of the present invention is a carbon black treated with an effective amount of a treating agent sufficient to improve the dispersing characteristics of the carbon black while still allowing the carbon black to be free flowing or subsequently pelletized, if desired, thereby forming a treated carbon black. While any carbon black may be utilized as the starting material, preferably the carbon black will have a DBPA (dibutyl phthlate absorption) of 35–130 cc/100 g and an $I_2No.$ (iodine adsorption number) of 25–150 $mgI_2/g$.

The treating agent suitable for use in the present invention comprises at least one compound containing at least one long chain alkenyl or alkyl group and at least one amine group. Preferably the alkenyl or alkyl group contains 50–100 carbon atoms and more preferably 60–70 carbon atoms.

Optionally, the compound may contain at least one chemical group suitable for linking the alkenyl or alkyl group with the amine group. The chemical group utilized as the linking component may be of any known type, provided that the resulting compound retains its usefulness as a treating agent in preparing easily dispersible carbon blacks. Exemplary suitable chemical linking groups are succinimide linkages, succinoyl linkages, glutarimide linkages and oxyalkylene linkages. When the compound contains more than one chemical linking group, the groups may be the same or different.

Included among the compounds suitable for use as treating agents in the present invention are alkenyl or alkyl succinimides of polyamines, alkenyl or alkyl succinimides of polyamines, alkenyl or alkyl amides of polyamines, alkenyl or alkyl polyamines, and esters of an alkenyl or alkyl succinic acid with hydroxyalkylpolyamines. Oligomeric materials containing alkenyl or alkyl succinimides of polyamines connected with $C(=O)CH_2CH(R)C=O$ linkages (R=alkenyl or alkyl) between nitrogen atoms are also suitable. Preferably, the alkenyl and alkyl groups are polymers of isobutene or propene containing 50 to 100 carbon atoms, and more preferably polymers of isobutene containing 60 to 70 carbon atoms. The polyamines are preferably polyalkylene polyamines of formula I below or cyclic analogues of formula I, in which R1=alkylene, R2 and R3=H or alkyl, and a=1 to 6. When the polyamines of formula I are utilized to prepare the compounds of formula II, III, or IV the polyamines are more preferably compounds wherein $R1=C_2H_4$, R2 and R3=H, and a=1 to 5. The hydroxyalkylpolyamines are preferably hydroxyalkyl polyalkylene polyamines of formula V, in which R1 and R4 are alkylene, R2, R3, and R5 are H or alkyl, and e=0 to 4, and can be used to make compounds of Formula VI. The hydroxyalkylpolyamines are more preferably compounds wherein R1 and $R4=C_2H_4$, R2, R3 and $R5=CH_3$ or $C_2H_5$ and e=0 to 2.

FORMULAS $NH_2-(R1-N(R2))_a-R3$      I:

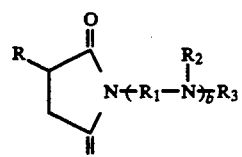
II:

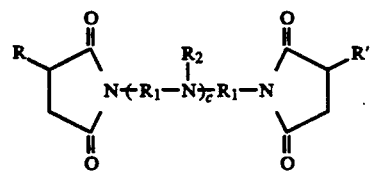
III.

$R-NH-(R1-N(R2))_a R3$      IV.

$HO-R4-N(R5)(R1-N(R2))_e-R3$      V:

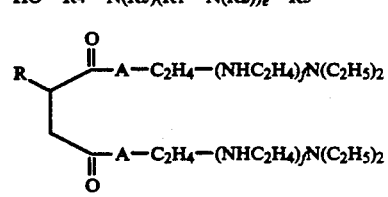
VI:

Specific examples of suitable treating agents are:
1. compounds of formula II wherein R=a polyisobutenyl group containing 60 to 70 carbon atoms, R1=$C_2H_4$, R2 and R3=H, and b=1 to 5.
2. compounds of formula III wherein R and R'=a polyisobutenyl group containing 60 to 70 carbon atoms, R1=$C_2H_4$, R2=H, and c=1 to 4.
3. compounds of formula IV wherein R=a polyisobutenyl group containing 60 to 70 carbon atoms, R1=$C_2H_4$, R2 and R3=H and d=1 to 5.
4. compounds of formula VI wherein R=a polyisobutenyl group containing 60 to 70 carbon atoms, A=O or NH, and f=0 to 2.

Representative treating agents include, but are not limited to: OLOA 1200 dispersant, believed to be a 40-50% solution, in mineral oil, of a $C_{70}$ polyisobutenyl succinimide of a polyamine, a trademarked product sold by Chevron Corporation, Richmond, Calif.; and Lubrizol 2165 dispersant, believed to be a 60% solution, in mineral oil, of $C_{60}$ polyisobutenyl succinimide of tetraethylene pentamine (TEPA), a trademarked product sold by Lubrizol Corporation, Wickliffe, Ohio.

The amount of treating agent utilized in the present invention will be an amount sufficient to improve the dispersing characteristics of the carbon black while still allowing the carbon black to be free flowing or subsequently pelletized, if desired. In general, the amounts would be such that the resultant carbon blacks have 0.25-20%, by weight, of treating agent. Preferably, the carbon blacks of the present invention are treated with amounts of the treating agent such that the resultant carbon blacks have 0.5-8%, by weight, of treating agent. In preparing the treated carbon blacks, additional conventional ingredients may be added. In all cases the weight fraction of carbon black in the treated carbon black is greater than 100/(100+DBPA of the carbon black), so that the treated carbon black is substantially dry and free-flowing.

We have also discovered new ink compositions in which the carbon blacks are incorporated.

The treated carbon black of the present invention may be prepared in many different manners. A process for preparing the treated carbon black of the present invention is as follows.

A carbon black is contacted with a mixture, in equal proportion, of a pelletizing oil and the treating agent. The amount of the mixture used will be sufficient to produce a treated carbon black having the desired level of treatment. In the present invention, the treated carbon black preferably has about 0.25-20%, and even more preferably 0.5-8% of the treating agent by weight of the black. The contacting of the black with the treating agent may occur at any point downstream of the quench where the treating agent is thermally stable.

Subsequent to contacting the carbon black with the treating agent, the resulting mixture may be agitated by any suitable means such as a conventional rotating drum or pin-type pelletizer, for example of the type described in U.S. Pat. Nos. 2,120,540 and 2,306,698, the disclosures of which are hereby incorporated by reference, until pellets of the desired quality are formed. The pelletizing oil suitable for use in the present invention may be any pelletizing oil known to the art. Preferably, however, for ink compositions the pelletizing oil is a nonvolatile, nonpolymerizable organic liquid, which is compatible with the ink composition. The more preferred pelletizing oils are mineral oils or modified mineral oils. A general description of a process for pelletizing, and types of pelletizing oils, which may be suitable for use in the present invention is found in U.S. Pat. No. 3,011,902, the disclosure of which is hereby incorporated by reference.

The following testing procedures are used in the determination and evaluation of the analytical properties of the carbon blacks of the present invention, and the physical properties of the ink compositions incorporating the carbon blacks of the present invention.

The $I_2$No. of each carbon black was determined according to ASTM D1510. The DBPA of each carbon black was determined according to the procedure set forth in ASTM D2414.

The $I_2$SA (iodine surface area) of each carbon black was determined according to ASTM D1510 with the following modifications. Two types of additional apparatus were utilized, a muffle furnace capable of attaining 927° C. and porcelain crucibles and covers, size 0. Procedure A of ASTM D1510 is utilized and is changed as follows. Step 9.1 of the ASTM D1510 procedure is replaced with the following steps:

1. Fill an uncracked size 0 porcelain crucible to above the top rim with carbon black. Press the lid down against the rim.
2. Place the crucible in a muffle furnace set to 927° C. for seven minutes.
3. Remove the crucible from the muffle furnace and allow to cool to room temperature in a desiccator.
4. Remove the crucible from the desiccator. Remove and discard the top approximately ¼ inch of the devolatilized black.

Step 9.2 of the ASTM D1510 procedure is replaced with the following step.

1. Weigh a mass, to the nearest 0.0001 gram, of the devolatilized black into a glass vial. Use the sample mass determined by the expected iodine surface area, as shown by the following table (Table 9.2 of ASTM D1510). If the result falls either above or below the range shown for that sample size, retest using the sample mass specified in the table for the range into which the result has fallen. Replace the first column of the table in 9.2 with the following column:

Iodine Surface Area
   ($m^2/g$)
   0-100.0
   100.1-270.0
   270.1-575.0
   575.1 and above.

Step 9.4 of the ASTM D1510 procedure is replaced with the following step:

1. Shake the vial vigorously for ten minutes at no less than 120 strokes/min.

Then $I_2$SA is calculated according to the following formula:

$$SA = [10(B-T) - 4.57]/1.3375 \times 0.8/SW$$

SA = $I_2$ surface area, in $m^2/g$
B = volume of titrate for the blank, in ml
T = volume of titrate for the sample, in ml
SW = actual sample weight, in g The above procedure corresponds to Cabot Corporation test procedure 23.2 for determining $I_2$SA.

The effectiveness and advantages of the present invention will be further illustrated by the following examples.

EXAMPLE 1

This example illustrates the preparation of a novel treated carbon black of the present invention. A fluffy carbon black having a DBPA of 77 cc/100 g and an $I_2SA$ of 46 m$^2$/g was treated with approximately 3.2% by weight of the fluffy black of a 50/50 mixture, by weight, of treating agent, which in this instance was OLOA 1200 dispersant, and Sunthene 450 oil. Sunthene 450 oil is a trademarked product of Sun Oil Co., Philadelphia, Pa., having an SUS viscosity (at 100° F.) of 502 (ASTM D2161) and a total aromatic content of 43.2%, by weight (ASTM D2007). The 50/50 mixture was sprayed on the fluffy carbon black just prior to entering a pin pelletizer. The resulting mixture was then agitated and dry pelletized to produce a treated black having 1.6% by weight, of treating agent.

EXAMPLE 2

The procedure of Example 1 was followed in all details except that 5.2% by weight of the treating agent mixture was used. The resulting treated black has 2.5%, by weight, of treating agent.

In the following examples, treated carbon blacks of the present invention are utilized in preparing newsink compositions. The newsink compositions are prepared by the following procedure.

The vehicle is prepared by combining the oils, solvents, resins, and additives and mixing in a rotor-stator mill or a high speed impeller mixer, until no sand or scratches are seen on a NPIRI production grindometer G2, usually at least 30 minutes.

280 grams of vehicle and 70 grams of carbon black, as well as any supplemental additives, are combined in a one quart container and mixed for 30 minutes using a high speed impeller mixer. A 70 gram sample of the premix is removed and held for testing. 900 grams of steel shot is then added and the premix is shot-milled, with agitation provided by a disc attached to the end of a rotating shaft. The shot mill grinding is complete when there are no scratches and a 20 micron sand reading is obtained on a NPIRI production grindometer G2. The ink is then filtered to separate the shot and is packed and labelled.

In the following examples, the "premix residue" was determined as follows. 25 g of the premix are weighed into a 4-oz glass jar with a screw-top lid. Mineral spirits are added to about ¾ of the jar's capacity. The jar and contents are shaken on a paint shaker for 5 minutes. The contents of the jar are poured through a clean 325-mesh sieve, and the jar is rinsed clean over the sieve with a stream of mineral spirits from a squeeze bottle. The residue on the sieve is rinsed with mineral spirits until the rinsings are clear. The sieve is dried in a 120 degree C. oven for 20 minutes. Then the residue is carefully brushed into a pre-weighed one-ounce tin, and the weight of material is reported as the premix residue.

In the following examples, the procedure for determining the "shot mill grind time" was as follows. Every two minutes during the shot mill grind, the grinding is stopped and a small sample of ink is removed, strained to remove the shot, and placed in the deep end of the channel on a NPIRI production grindometer G2. The ink is drawn down the channel using a straight-edged steel scraper. Scratches in the ink layer are noted. Also noted is the point where sand, defined as small dots which seem to protrude from the surface of the ink, appears. The depth of the channel at this point is read from the side of the grindometer and recorded in microns. Grinding is continued until there are no scratches and the sand does not appear until the channel depth is 20 microns or less. The time at which a 20 micron sand reading is reached is recorded as the shot mill grind time.

EXAMPLE 3

This example illustrates the preparation of a newsink composition incorporating a treated carbon black of the present invention. This example also illustrates the advantages arising from using the treated carbon blacks of the present invention in newsink compositions.

In order to compare newsink compositions of the present invention with conventional newsink compositions, a conventional newsink composition A was prepared using a pelletized carbon black prepared from a fluffy carbon black having a DBPA of 77 cc/100 g and an $I_2SA$ of 46 m$^2$/g sprayed with 5.6% Sunthene 450 oil. Newsink composition B was prepared with the carbon black of Example 1 which was treated with a mixture of treating agent and oil. Newsink composition C was prepared with the carbon black of Example 2 which was treated with a higher level of the mixture of treating agent and oil.

Newsink compositions A, B, and C were prepared by incorporating each of the carbon black samples in the newsink formulation shown below in Table I.

TABLE I

| INGREDIENT | Part by weight |
|---|---|
| Carbon Black | 20.0 |
| PICCO 5140 resin | 8.6 |
| Sunthene 480 oil | 57.0 |
| MAGIE SOL 47 oil | 11.4 |
| EXX-PRINT 991 oil | 3.0 |

PICCO 5140 resin is high softening point hydrocarbon resin, and is a trademarked product sold by Hercules Incorporated, Wilmington, Del.

Sunthene 480 oil is a trademarked product of Sun Oil Co., Philadelphia, Pa., having an SUS viscosity (at 100° F.) of 760 (ASTM D2161) and a total aromatic content of 42.4%, by weight (ASTM D2007).

MAGIE SOL 47 oil is a solvent oil, essentially 100% saturated hydrocarbons, and is a trademarked product sold by Magie Bros. Oil Company, A Pennzoil Company Division, Franklin Park, Ill. 60131.

EXX-PRINT 991 oil is a residual oil, approximately 41%, by weight, aromatics and is a trademarked product sold by Exxon Corporation, Houston, Tex.

The shot mill grind time and the premix residue of these newsink compositions were then determined according to the procedures described herein. The results were as follows:

| Newsink Composition | SHOT MILL GRIND TIME (min) | PREMIX RESIDUE (g/25 g newsink) |
|---|---|---|
| A | 9 | 1.83 |
| B | 6 | 1.25 |
| C | 5 | 0.72 |

These results show that by incorporating in a newsink composition a treated carbon black of the present invention, the premix residue and shot mill grind time are reduced in comparison with a newsink composition in which an untreated carbon black is utilized. A reduction in the premix residue indicates that less time would be required in the premix stage to reach a specified level of residue. This would result in an economic benefit to the ink maker. Similarly, the reduction in the shot mill grind time would also result in an economic benefit. The results of this example also show that higher levels of the treating agent on the black can be more effective.

EXAMPLE 4

This example illustrates the improvement resulting from incorporating in a newsink composition a carbon black of the present invention which has been treated with a treating agent as compared with incorporating the untreated carbon black and the same treating agent as separate ingredients.

Newsink composition A is composition A from Example 3, produced from an untreated carbon black and without treating agent. Newsink composition D contains treating agent in the vehicle and was prepared with the same untreated carbon black used in newsink composition A. Newsink composition E was prepared with the carbon black of Example 2 which was treated with a mixture of treating agent and oil. Newsink compositions D and E were prepared by incorporating each of the carbon blacks in the newsink formulation shown below in Table II.

TABLE II

| INGREDIENT | Part by weight | |
|---|---|---|
| | D | E |
| Carbon Black | 19.9 | 19.9 |
| PICCO 5140 resin | 8.6 | 8.6 |
| Sunthene 480 oil | 56.6 | 56.6 |
| MAGIE SOL 47 oil | 11.3 | 11.3 |
| EXX-PRINT 991 oil | 3.0 | 3.0 |
| OLOA 1200 dispersant | 0.6 | 0.0 |
| Sunthene 450 oil | 0.0 | 0.6 |

The shot mill grind time and the premix residue of newsink compositions A, D and E were then determined according to the procedures described herein. The results were as follows:

| Newsink Composition | SHOT MILL GRIND TIME (min) | PREMIX RESIDUE (g/25 g newsink) |
|---|---|---|
| A | 9 | 1.83 |
| D | 6 | 1.38 |
| E | 5 | 0.80 |

These results show that by incorporating in a newsink composition a treated carbon black of the present invention, the premix residue and shot mill grind time are reduced to a significantly greater degree than when the same amounts of the same carbon black in an untreated form and the same treating agent are incorporated separately.

The reduction in premix residue shows that it would take less time in the premix stage of ink preparation to reach a specified level of residue. The reduction in shot mill grind time similarly shows that less time would be required in the shot mill stage to reach the desired final degree of dispersion. These factors taken separately, and particularly when taken together, result in lower energy costs per unit of ink produced and/or result in a greater throughput capability for a given ink-manufacturing plant, leading to an economic benefit for the ink maker.

These results confirm what is known in the art, namely, that some benefit is achieved by incorporating separately in a newsink composition an untreated carbon black and the treating agent. However, more importantly, these results also clearly show that greater benefits may be obtained by incorporating a treated carbon black of the present invention in a newsink composition.

EXAMPLE 5

This example illustrates the improvement resulting from incorporating a carbon black of the present invention in a newsink composition of a higher viscosity than the newsink compositions of Example 4.

Newsink composition F was prepared with the carbon black of Example 2 which was treated with a 50/50 mixture of OLOA 1200 dispersant and Sunthene 450 oil. Newsink compositions G and H were prepared with the same carbon black without treating agent used in newsink composition A. Newsink composition G contains the treating agent added separately to the vehicle. Newsink composition H contains no treating agent. Newsink compositions F, G and H were prepared by incorporating each of the carbon blacks in the newsink formulations shown below in Table III. The amounts of the Sunthene oils were chosen to produce inks of constant viscosity.

TABLE III

| INGREDIENT | Part by weight | | |
|---|---|---|---|
| | F | G | H |
| Carbon Black | 20.0 | 20.0 | 20.0 |
| PICCO 5140 resin | 4.8 | 4.8 | 4.8 |
| Sunthene 480 oil | 33.7 | 33.7 | 33.7 |
| Sunthene 4240 oil | 38.0 | 38.0 | 26.5 |
| EXX-PRINT 991 oil | 3.0 | 3.0 | 3.0 |
| OLOA 1200 dispersant | 0.0 | 0.6 | 0.0 |
| Sunthene 450 oil | 0.6 | 0.0 | 0.6 |

Sunthene 4240 oil is a trademarked product of Sun Oil Co., Philadelphia, Pa., having an SUS viscosity (at 100° F.) of 2300 (ASTM D2161) and a total aromatic content of 46.7% by weight (ASTM D2007).

The shot mill grind time and the premix residue of newsink compositions F, G and H were then determined according to the procedures described herein. The results were as follows:

| Newsink Composition | SHOT MILL GRIND TIME (min) | PREMIX RESIDUE (g/25 g newsink) |
|---|---|---|
| F | 6 | 0.83 |
| G | 8 | 1.19 |
| H | 8 | 2.20 |

These results show that the premix residue and shot mill grind time are reduced by incorporating a treated carbon black of the present invention in a newsink composition as compared to incorporating untreated carbon black in the newsink composition. These results also show that the premix residue and shot mill grind time are reduced to a greater degree by incorporating a treated carbon black of the present invention in a newsink composition than by incorporating the same carbon black in an untreated form and the same treating agent separately in a newsink composition.

As described in Example 4, the greater reduction in premix residue and shot mill grind time yields greater economic benefits for the ink maker.

EXAMPLE 6

This example illustrates the advantages arising from using the treated carbon blacks of the present invention in two additional newsink compositions having resin and additive combinations different from Example 5.

Newsink compositions J and K were prepared using a pelletized carbon black prepared from a fluffy carbon black having a DBPA of 76 cc/100 g and an $I_2SA$ of 51 m$^2$/g sprayed with 6.5% Sunthene 450 oil. Newsink compositions L and M were prepared with the carbon black of Example 2, which is a similar carbon black treated with a 50/50 mixture of OLOA 1200 dispersant and Sunthene 450 oil.

Newsink compositions J, K, L and M were prepared by incorporating each of the carbon black samples in the newsink formulation shown below in Table IV. The amounts of the Sunthene oils were chosen to produce inks of constant viscosity.

TABLE IV

| INGREDIENT | Part by weight | | | |
|---|---|---|---|---|
| | J | L | K | M |
| Carbon Black | 20.0 | 20.0 | 20.0 | 20.0 |
| PICCO 5140 resin | — | — | 4.0 | 4.0 |
| Sunthene 450 oil | 69.4 | 69.3 | 55.2 | 13.8 |
| Sunthene 480 oil | — | — | 13.8 | 55.2 |
| EXX-PRINT 991 oil | 3.0 | 3.0 | 3.0 | 3.0 |
| ZECO 11 gilsonite | 7.6 | 7.7 | 4.0 | 4.0 |

ZECO 11 gilsonite is a trademarked product sold by Ziegler Chemical and Mineral Corporation, Jericho, N.Y.

The shot mill grind time and the premix residue of newsink compositions J, K, L and M were then determined according to the procedures described herein. The results were as follows:

| Newsink Composition | SHOT MILL GRIND TIME (min) | PREMIX RESIDUE (g/25 g newsink) |
|---|---|---|
| J | 12 | 2.37 |
| L | 6 | 0.34 |
| K | 12 | 2.20 |
| M | 8 | 1.02 |

These results show that by incorporating a treated carbon black of the present invention in a newsink composition, the premix residue and shot mill grind time are reduced, in a variety of different newsink formulations.

EXAMPLE 7

This example illustrates the advantages arising from treating a carbon black having good rub-off characteristics and poor dispersibility properties with a treating agent according to the present invention.

Newsink composition N was prepared with the same untreated carbon black used in newsink compositions J and K. This carbon black has good rub-off characteristics and poor dispersibility properties. Newsink composition P was prepared with the treated carbon black of Example 2 which is a similar carbon black treated with a 50/50 mixture of OLOA 1200 dispersant and Sunthene 450 oil. Newsink composition Q was prepared with ELFTEX PELLETS 115 carbon black (DBPA of 115 cc/100 g and $I_2$No. of 67 mgI$_2$/g), a trademarked product of Cabot Corporation, Waltham, Mass., which is a carbon black typically used in newsink compositions. This carbon black has good dispersibility properties and poor rub-off characteristics.

Newsink compositions N, P, and Q were prepared by incorporating each of the carbon black samples in the newsink formulation shown below in Table V. The amounts of the Sunthene oils were chosen to produce inks of constant viscosity.

TABLE V

| INGREDIENT | Part by weight | | |
|---|---|---|---|
| | N | P | Q |
| Carbon Black | 20.0 | 20.0 | 20.0 |
| PICCO 5140 resin | 4.8 | 4.8 | 5.0 |
| Sunthene 450 oil | — | — | 72.0 |
| Sunthene 480 oil | 45.4 | 33.9 | — |
| Sunthene 4240 oil | 26.7 | 38.2 | — |
| EXX-PRINT 991 oil | 3.0 | 3.0 | 3.0 |

The shot mill grind time and the premix residue of newsink compositions N, P and Q were then determined according to the procedures described herein. The rub-off was determined as follows. For each ink, several 1 inch by 8.5 inch prints on newspaper were prepared at varying optical densities. The optical densities were measured with a densitometer a few minutes after printing. The prints were rubbed one hour after printing by pulling a tissue, weighted with a 3 pound weight 2 inches in diameter, over the length of the print in 10 seconds. The darkness value of the spot on each tissue was measured with a Hunter colorimeter and compared to the L value of the clean tissue. The difference in L values is termed the "delta L value". A line was fitted to a plot of the logarithms of the delta L values from the colorimeter versus the optical densities of the original prints. The rub-off is expressed as the logarithm of the delta L value from this line when the optical density is 1. A higher value represents a darker tissue and a poorer rub-off. The results were as follows:

| Newsink Composition | SHOT MILL GRIND TIME (min) | PREMIX RESIDUE (g/25 g newsink) | RUB-OFF |
|---|---|---|---|
| N | 11 | 2.18 | 0.82 |
| P | 6 | 0.80 | 0.86 |
| Q | 8 | 0.22 | 1.03 |

These results show that by incorporating a treated carbon black of the present invention in a newsink composition, the premix residue and shot mill grind time are reduced as compared to a newsink composition incorporating a similar carbon black in an untreated form. These results also show that by treating a carbon black having good rub-off characteristics and poor dispersibility with a treating agent, according to the present invention, the dispersibility properties, as measured by a balance of shot mill grind time and premix residue, may be made comparable to those of ELFTEX PELLETS 115 carbon black, a carbon black having good dispersibility characteristics. These results also show that the rub-off of an ink made with a treated carbon black of the present invention is comparable to the rub-off of an ink made with a similar carbon black in an untreated form, both being superior to the rub-off of an ink made from ELFTEX PELLETS 115 carbon black.

EXAMPLE 8

This example demonstrates the efficacy of several different compounds as treating agents according to the present invention. It also demonstrates that similar compounds with shorter hydrocarbon chains are not effective.

The treated carbon blacks used in this example were prepared as follows. 150 g of REGAL 250R carbon black, a trademarked carbon black of Cabot Corporation, Waltham, Mass. (DBPA of 46 cc/100 g and $I_2$No. of 68 mg$I_2$/g) were placed in a small tumble drum, approximately 10 inches in diameter by 12 inches in length with one completely closed end. A 10% by weight solution of the treating agent in xylenes or hexanes was prepared. While tumbling the carbon black, 45 g of the solution were sprayed into the drum through a hole in one end. The black and solution were tumbled for another 45 minutes to mix. The treated carbon black was then dried overnight in a vacuum oven at 80° C. to remove the solvent. The black was not pelletized.

The newsink compositions of this example were prepared using a rotorstator mill. 713 g of the test vehicle (96.5 parts by weight Sunthene 450 oil and 3.5 parts by weight EXX-PRINT 991 oil) were placed in a two-quart container on the rotor-stator mill, which was turned on to approximately 40% power. 62 g of the carbon black were added over a period of 3 minutes. Then the power was increased to 90% for 25 minutes. The composition of the final ink is 8.0 parts by weight carbon black, 88.8 parts by weight Sunthene 450 oil, and 3.2 parts by weight EXX-PRINT 991 oil.

The finished ink was poured into the hopper of the test unit. From there it is pumped at a constant volumetric flow rate through a 325 mesh screen and into a plastic container. The increase in the pressure drop across the screen was measured and recorded using a strip-chart recorder. The time it took for the pressure to increase to 1, 5, 10 and 20 psig was reported. A longer time to reach a particular pressure level indicates a more easily dispersible carbon black.

Newsink compositions U, V, W, X, Z, A1, B1, C1 and D1 were prepared using REGAL 250R carbon black treated as described above with the treating agent compounds shown in the table below. Newsink compositions U and C1 were included for comparison, to account for any deleterious effects of wetting the carbon black with a solvent or of the tumbling action. Newsink composition U was included as the reference for newsink compositions V, W, X, Z, A1, and B1. Newsink composition C1 was included as the reference for newsink composition D1. The newsink compositions were prepared by incorporating each of the carbon black samples in the newsink formulation described above.

| Newsink Composition | Treating Agent Used |
|---|---|
| U | Xylenes |
| V | VV |
| W | WW |
| X | XX |
| Z | OLOA 1200 dispersant |
| A1 | AA1 |
| B1 | BB1 |
| C1 | Hexanes |
| D1 | DD1 |

VV is a compound of formula III, described above, in which R and R' = a polyisobutenyl group having 60 carbon atoms, R1 = $C_2H_4$, R2 = H, and c = 3.
WW is a compound formed by linking the amine groups of compounds of composition VV with C=(O)CH$_2$CHRC=(O) groups, in which R = a polyisobutenyl group having 60 carbon atoms.
XX is a compound of formula VI, described above, in which R = a polyisobutenyl group having 60 carbon atoms, A is an oxygen atom, and f = 0.
AA1 is a compound of formula III, described above, in which R and R' = a polyisobutenyl group having 24 carbon atoms, R1 = $C_2H_4$, R2 = H, and c = 3.
BB1 is a compound of formula III, described above, in which R and R' = a polypropenyl group having 12 carbon atoms, R1 = $C_2H_4$, R2 = H, and c = 3.
DD1 is a compound of formula II, described above, in which R = a polyisobutenyl group having 60 carbon atoms, R1 = $C_2H_4$, R2 and R3 = H, and b = 1.

Newsink compositions U, V, W, X, Z, A1, B1, C1 and D1 were then tested as described above. The time to reach each pressure was determined.

The results were as follows:

| Newsink Composition | TIME TO REACH PRESSURE (in seconds) | | | |
|---|---|---|---|---|
| | 1 psi | 5 psi | 10 psi | 20 psi |
| U | 17.8 | 20.5 | 22.5 | 26.0 |
| V | 18.7 | 21.6 | 23.3 | 27.3 |
| W | 19.3 | 22.8 | 25.2 | 30.1 |
| X | 21.5 | 25.6 | 28.2 | 33.6 |
| Z | 17.2 | 22.3 | 32.0 | 38.6 |
| A1 | 11.7 | 14.5 | 17.1 | 21.2 |
| B1 | 9.8 | 11.2 | 12.2 | 13.6 |
| C1 | 21.2 | 25.3 | 27.7 | 31.5 |
| D1 | 27.2 | 34.4 | 38.1 | — |

The results of V, W, X, Z, C1 and D1 show that carbon blacks treated with various treating agents of the present invention are more easily dispersible than an untreated version of the same carbon black of U. Moreover, the results of U, A1 and B1 show that when compounds similar to the treating agents of the present invention, except that the hydrocarbon chains are shorter, are used to treat carbon black, the dispersibility of the treated carbon black is not improved compared to the untreated version of the same carbon black.

EXAMPLE 9

This example illustrates another method for the preparation of a novel treated carbon black of the present invention.

REGAL 500R carbon black, a trademarked carbon black sold by Cabot Corporation, Waltham, Mass., having a DBPA of 65 cc/100 g and an $I_2$No. of 88 mg$I_2$/g was treated with an emulsion of treating agent, which in this instance was OLOA 1200 dispersant, in water. The emulsion was prepared as follows. A solution of 3 g of Witconate P10-59 amine alkylaryl sulfonate solubilizing agent, a trademarked product of Witco Corporation, New York, N.Y., in 20 g of OLOA 1200 dispersant was added to 100 g water, heated to 80° C. and sonified for 5 minutes using a portable ultrasonic probe. 175 g of water was then added in 3 portions with a 3 minute sonification after each addition. After removing scum from the emulsion, 114 g of the emulsion was added to 110 g of carbon black in a mixing bowl while stirring with an electric mixer at 148 rpm. The product was stirred for an additional 5 minutes and dried in an oven at 120° C. overnight. The resulting product is a carbon black treated with the OLOA 1200 dispersant and the solubilizing agent.

EXAMPLE 10

This example demonstrates the improvement resulting from incorporating a carbon black of the present invention in a gloss heat set ink composition.

Gloss heat set ink E1 was prepared with the treated carbon black of Example 9. Gloss heat set ink F1 was prepared with a wet-pelletized carbon black prepared from the same untreated fluffy carbon black used in Example 9.

The masterbatch for these inks was prepared by slowly adding 1470 g of −10 mesh Pentalyn K resin to 1530 g of Magie 470 oil at 170° F., stirring with a high speed impeller for at least one hour, and passing through a three roll mill. Pentalyn K resin is a pentaerythritol ester of dimer rosin acids, and is a trademarked product of Hercules Incorporated, Wilmington, Del. Magie 470 oil is a trademarked product of Magie Bros. Oil Co., a Pennzoil Company Division, Franklin Park, Ill., having an aromatic content of 8.7% and an olefinic content of 3.7%.

The inks were prepared as follows. 49.8 g of carbon black is mixed with 281.8 g of the masterbatch in a high speed impeller mixer at 150° F. for 15 minutes. A 70 g sample of the premix is removed and held for testing. 1225 g of steel shot is added and the premix is shot-milled, with agitation provided by a disc attached to the end of a rotating shaft. Samples of ink are removed after 5 and 10 minutes of shot milling. The ink is finished after 15 minutes of shot milling.

The premix residue is determined by combining 5.0 g of the premix with 50 ml of mineral spirits in a glass jar and shaking for one minute. The mixture is then passed through a 325 mesh screen under suction and rinsed until the filtrate is clear. The screen is then dried at 205° C. for 10 minutes, and the residue is brushed out and weighed. The fineness of grind was determined with a NPIRI production grindometer G2. The gloss was determined at 60 degrees using a glossmeter on a sample of ink that had been printed on a sheet of coated white paper and cured for 7 seconds at 275° F. The results were as follows:

| GLOSS INK COMPOSITION (%) | PREMIX RESIDUE (%) | FINENESS OF GRIND-SAND μm | | | 60° Gloss (%) |
|---|---|---|---|---|---|
| | | 5 min | 10 min | 15 min | |
| E1 | 2.3 | 28 | 20 | 14 | 47 |
| F1 | 4.5 | 40 | 20 | 23 | 38 |

These results show that by incorporating in a heat set gloss ink composition a carbon black of the present invention having a treating agent and a solubilizing agent, the premix residue and sand levels are reduced in comparison with a heat set gloss ink in which an untreated carbon black is utilized. This would result in an economic benefit to the ink maker. These results also show that when a carbon black of the present invention, having a treating agent and a solubilizing agent is incorporated in a heat set gloss ink composition, the gloss is superior to that of a heat set gloss ink in which an untreated carbon black is utilized. The superior gloss would also provide an economic advantage to the ink maker.

It should be clearly understood that the forms of the present invention herein described are illustrative only and are not intended to limit the scope of the invention.

What is claimed:

1. A treated carbon black comprising:
   a carbon black and a treating agent comprising at least one compound of which at least one compound contains both at least one long chain alkenyl group having 50–100 carbon atoms and at least one amine group, wherein the fraction, by weight, of carbon black in the treated carbon black is greater than 100/(100+DBPA of the carbon black) and wherein the carbon black is treated with an amount of treating agent sufficient to improve the dispersing characteristics of the carbon black while still allowing the carbon black to be substantially dry and free flowing or subsequently pelletized.

2. A treated carbon black comprising:
   a carbon black and a treating agent comprising at least one compound of which at least one compound contains both at least one long chain alkyl group having 50–100 carbon atoms and at least one amine group, wherein the fraction, by weight, of carbon black in the treated carbon black is greater than 100/(100+DBPA of the carbon black) and wherein the carbon black is treated with an amount of treating agent sufficient to improve the dispersing characteristics of the carbon black while still allowing the carbon black to be substantially dry and free flowing or subsequently pelletized.

3. The treated carbon black of claim 1 wherein the alkenyl group contains 60–70 carbon atoms.

4. The treated carbon black of claim 2 wherein the alkyl group contains 60–70 carbon atoms.

5. The treated carbon black of claim 1 wherein the compound further contains at least one chemical group for linking the long chain alkenyl group with the amine group.

6. The treated carbon black of claim 2 wherein the compound further contains at least one chemical group for linking the long chain alkyl group with the amine group.

7. The treated carbon black of claim 5 or 6 wherein the linking chemical group is selected from succinimide linkages, succinoyl linkages, and a mixture of succinimide linkages and succinoyl linkages.

8. The treated carbon black of claim 1 wherein the treating agent has the formula:

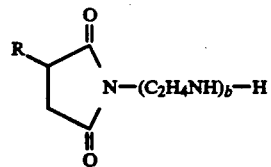

wherein R = a polyisobutenyl group containing 60 to 70 carbon atoms and b = 1 to 5.

9. The treated carbon black of claim 1 wherein the treating agent has the formula:

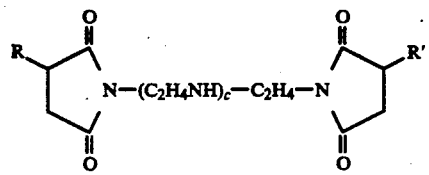

wherein R and R' = a polyisobutenyl group containing 60 to 70 carbon atoms, and c = 1 to 4.

10. The treated carbon black of claim 1 wherein the treating agent has the formula:

R—NH—(C$_2$H$_4$—NH)$_d$—H wherein R = a polyisobutenyl group containing 60 to 70 carbon atoms, and d=0 to 5.

11. The treated carbon black of claim 1 wherein the treating agent has the formula:

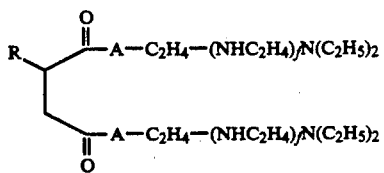

wherein R = a polyisobutenyl group containing 60 to 70 carbon atoms, A=0 or NH, and f=0 to 2.

12. The treated carbon black of claim 1 wherein the carbon black is treated with sufficient treating agent to produce a treated carbon black having 0.25-20%, by weight, of treating agent.

13. The treated carbon black of claim 12 wherein the carbon black is treated with sufficient treating agent to produce a treated carbon black having 0.5-8%, by weight, of treating agent.

* * * * *